United States Patent
Dhanuka et al.

(10) Patent No.: US 10,713,417 B2
(45) Date of Patent: Jul. 14, 2020

(54) CONTEXTUAL FONT FILTERING IN A DIGITAL MEDIUM ENVIRONMENT

(71) Applicant: Adobe Inc., San Jose, CA (US)

(72) Inventors: Praveen Kumar Dhanuka, Howrah (IN); Sanjeev Kumar Biswas, Bangalore (IN); Amit Gaurav, Jamshedpur (IN); Ankur Murarka, Cuttack (IN)

(73) Assignee: Adobe Inc., San Jose, CA (US)

( * ) Notice: Subject to any disclaimer, the term of this patent is extended or adjusted under 35 U.S.C. 154(b) by 65 days.

(21) Appl. No.: 15/489,173

(22) Filed: Apr. 17, 2017

(65) Prior Publication Data

US 2018/0300294 A1    Oct. 18, 2018

(51) Int. Cl.
*G06F 17/20* (2006.01)
*G06F 40/109* (2020.01)

(52) U.S. Cl.
CPC .................................. *G06F 40/109* (2020.01)

(58) Field of Classification Search
None
See application file for complete search history.

(56) References Cited

U.S. PATENT DOCUMENTS

| | | | | |
|---|---|---|---|---|
| 6,512,531 B1 * | 1/2003 | Gartland | ............... | G06F 3/0481 345/467 |
| 7,444,591 B1 * | 10/2008 | Sorenson | ............... | G06F 17/211 715/235 |
| 2002/0085006 A1 * | 7/2002 | Shade | ................... | G06F 17/214 345/471 |
| 2004/0119715 A1 * | 6/2004 | Everett | ................. | G06F 17/214 345/471 |
| 2010/0199168 A1 * | 8/2010 | Balinsky | ............... | G06F 17/211 715/234 |
| 2014/0195903 A1 * | 7/2014 | Kaasila | ................. | G06F 17/214 715/269 |
| 2014/0365881 A1 * | 12/2014 | Suarez | ................. | G06F 17/214 715/269 |
| 2016/0307347 A1 * | 10/2016 | Matteson | ............... | G06F 17/214 |
| 2017/0004113 A1 * | 1/2017 | Gore | ..................... | G06F 3/0482 |

\* cited by examiner

*Primary Examiner* — Shahid K Khan
(74) *Attorney, Agent, or Firm* — SBMC

(57) ABSTRACT

Techniques and systems are described for contextually filtering font styles. Techniques include identifying font features as filtering parameters to be applied to filter available font styles. The font features are identified automatically in a selected text and/or via user input. Additionally or alternatively, techniques include identifying font attributes as filtering parameters to be applied to filter available font styles. The font attributes are identified automatically in a selected text and/or via user input. After filtering, candidate font styles are presented to a user for selection.

20 Claims, 6 Drawing Sheets

302    ½ ffi year 2013
120    122    124

304    ½ ffi year 2013    126 / 128 / 130 / 132

306

308

CONTEXTUAL FONT FILTERING IN A DIGITAL MEDIUM ENVIRONMENT

BACKGROUND

Font styles include various combinations of features and attributes to support a several different contexts in the creation of digital content by a computing device that includes text. In order to locate a particular font style of interest, however, conventional computing devices often require a user to manually navigate through hundreds and even thousands of font styles that are available via the computing device to locate a font style that fits a context of the digital content being created. Thus, although a large list of font styles may provide several different creative options, the number of available options made available by conventional computing devices may make it difficult to use these options in practice thereby resulting in user frustration and avoidance of these options by the user.

SUMMARY

Techniques and systems for contextual font filtering are described. In one example, techniques are implemented using a computing device for filtering available font styles based on context, e.g., a font style of a current text (or "displayed text"). To do so using a font style of a current text displayed via a user interface, the computing device first identifies font features of the current text. The computing device then uses the identified font features as filtering parameters to apply against a library of available font styles to determine at least one candidate font style that includes, or is otherwise based on, the identified font features. Once the candidate font styles are determined, the computing device presents the candidate font styles in a user interface for selection by a user. In this way, the computing device may filter available font styles to present candidate font styles that are contextually relevant to the user based on displayed text in a user interface. As a result, the computing device supports user interaction with an increased range of font styles in an efficient and intuitive manner over conventional manual navigation techniques.

Alternatively or additionally, the computing device may filter available font styles based on context received via input from a user. The computing device may, for example, present a plurality of font features and/or font attributes in a user interface for selection by a user to define filtering parameters. The computing device then receives an input from the user to select at least one of the plurality of font features and/or font attributes and determines at least one candidate font based on the input. Once candidate font styles are determined, the computing device presents the candidate font styles in the user interface for selection by the user to apply to current text or to define new text to be entered by the user. In this way, the computing device uses input from a user to contextually filter available font styles to present candidate font styles that are contextually relevant based on the input from the user.

Additional or alternative implementations provide a computing device for contextually filtering available font styles and/or attributes based on a font style of a current text displayed in a user interface in addition to input from a user to select font features and/or font attributes for filtering. For example, the computing device first identifies font features in a text displayed via a user interface. The computing device then provides a user interface for receiving an input to select at least one of the identified font features to use as font features for filtering. Then the computing device determines at least one candidate font style based on the selected font features and presents the candidate font styles in the user interface for selection by a user. Thus, the computing device contextually filters available font styles based on current text in a user interface and input from the user to refine the identified font features into desired filtering parameters.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of at least one entity and thus reference may be made interchangeably to single or plural forms of the entities in the discussion.

DETAILED DESCRIPTION

Overview

Figure 1:
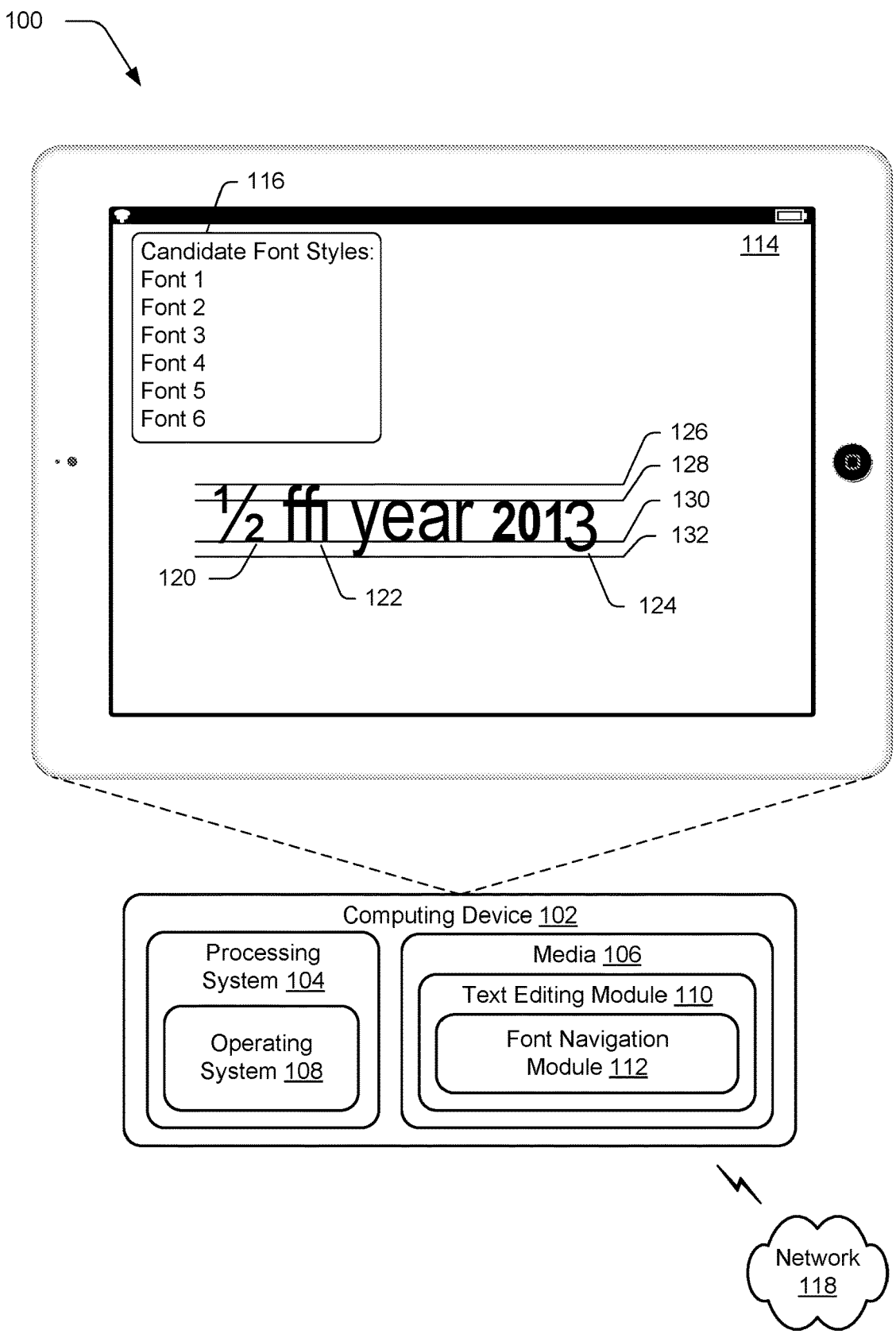
FIG. 1 depicts a system in an example implementation that is operable to employ techniques for contextual font filtering as described herein.

Conventional techniques implemented by a computing device for user selection of font styles often require the user to manually scroll through hundreds and even thousands of available font styles in a user interface. The user inputs involved in this user selection, for instance, typically first involve selection from available font styles. The user is then forced to visually confirm if the font style is contextually relevant within a context of digital content being created by the user. If not, this process is repeated until a contextually relevant font style is found, if available. Thus, although a variety of font styles is beneficial to afford creative selection of font styles by the user, it also creates a burden for the user to find and select a contextually relevant font style as part of interaction with these conventional techniques. As such, conventional font selection techniques used to locate contextually relevant font styles are often time-consuming, inaccurate, frustrating, and involve inefficient use of computational resources resulting from repeated receipt and application of user inputs to find a contextual font.

Accordingly, techniques and systems are described to improve the computer-related technology of font style selection using contextual font filtering. In one example, techniques are employed by a computing device to aid user selection of a contextually relevant font style. An author, for instance, may write an article on a computing device using a font style that includes a fraction font feature, e.g., to write a ½. If the author decides to change to a new font style, but wants to select a new font style from only candidate font styles that also include this fraction feature, the author can utilize a user interface of the computing device to select a portion of the text including the fraction feature. The computing device then identifies the fraction feature in the selected portion of the text and uses the fraction feature as a filtering parameter to apply against available font styles and to determine candidate font styles. The candidate font styles are then presented to the user via the user interface for the user to select a different, contextually relevant font style. Thus the user saves time by avoiding previewing all available font styles and instead previews only contextually relevant font styles, which also conserves computing device resources as opposed to conventional techniques as described above. As a result, the user is able to efficiently compare candidate font features and select a contextually relevant font style as desired based on various combinations of features and attributes present in the candidate font styles. Further discussion of these and other examples are included in the follow sections and shown in corresponding figures.

Terms

"Font attribute" refers to a structural element of a font such as a baseline, an x-height, an ascender height, a descender height, ICF Box size, EM-Box size, or line gap distance. The structural elements may be defined in relation to other structural elements. For example, an x-height may be defined as a fraction of a distance from the baseline to the ascender height. Additionally or alternatively, the x-height may be defined as a real distance from the baseline or ascender, measured in pixels, metric system units, or English units, for example.

A "baseline" is an imaginary line upon which letters rest such that bottom edges of the letters touch the baseline.

An "x-height" is a position of an imaginary line that may rest upon a top edge of lowercase letters (e.g., "x").

An "ascender height" is a position of an imaginary line that may rest upon a top edge of capitalized letters.

A "descender height" is a position of an imaginary line to which letters having a descender (e.g., g, j, p, q, and y) extend.

A "character" is a defined element of text such as a letter, a number, or punctuation. The character may be A "glyph" is a rendering of a character for presentation via a user interface. Glyphs include stylistic elements for rendering the character.

"Font feature," also known as typographical feature, refers to a design element of a font such as a ligatures, fractions, oldstyle figures, ordinals, tabular figures, capital spacing, petite caps, and slashed zero.

"Font style" refers to a defined combination of font features and font attributes for use in rendering glyphs based on text characters in digital content. A font style includes computer-readable instructions connecting a character (defined, for example by a Unicode character encoding) to a glyph rendering of the character (defined by a Glyph ID internal to the font style instructions). For example, a text character associated with a key of a keyboard may be rendered as a glyph on a user interface based on the computer-readable instructions. The computer-readable instructions also provide instructions for rendering glyphs based on font features as defined by the font style. In some instances, a glyph is always rendered with a font feature, such as always rendering a slashed "0" when the character generally connecting to "0" is entered in a font style that includes a slashed 0 font feature. In other instances, a glyph is only rendered with a font feature if a condition, defined in the computer-readable instructions, is met. For example, a first number character followed by a "/" and a second number character may be rendered based on a fraction feature, whereas the number is not rendered based on the fraction feature in other contexts. In such examples of rendering based on the fraction feature, the computer-readable instructions may cause smaller versions, such as subscript versions, of the first and second numbers to be substituted for standard versions of the first and second numbers to render based on the fraction feature. The computer readable instructions also include definitions of font attributes for rendering glyphs. The glyphs may be rendered in any type of digital content that is operable to receive text character input, such as a digital document, web-based application, image editing application, and the like.

"Available font styles" refers to a collection of font styles accessible for display in a user interface. Examples of available font styles include Adobe® Text Pro Regular, Arcadia™ Std Roman, Briem® Script Std Regular, Calcite® Pro Bold, Times™ Std Roman, etc.

"Candidate font styles" refer to font styles of the available font styles that are contextually relevant based on one or more of a user selection of font features, a user selection of font attributes, font features of a selected text or font attributes of a selected text.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital media environment 100 in an example implementation that is operable to employ techniques described herein. The illustrated environment 100 includes a computing device 102 configured for use in contextual font filtering, which may be configured in a variety of ways.

The computing device 102 may be configured in a variety of different ways. For example, the computing device 102 may be configured as a desktop computer, a laptop computer, a television, a mobile device (e.g., assuming a handheld configuration such as a tablet or mobile phone as illustrated), a tablet, and so forth. Additionally, although a single computing device 102 is shown, the computing device 102 may be representative of a plurality of different devices to perform operations "over the cloud" as further described in relation to FIG. 6.

The computing device 102 is illustrated as having a processing system 104 that includes one or more processing devices and computer-readable storage media 106 (illustrated as "Media"). The processing system 104 includes an operating system 108 for managing system resources and accessing the media 106. The media 106 includes a text editing module 110 having a font navigation module 112 that is operable via the processing system 104 to implement corresponding functionality described herein.

The font navigation module 112 is configured to contextually filter available font styles and present, or cause to be presented, candidate font styles 116 via the user interface 114. As shown, the contextual font filtering may be based on one or more font features of the text ("½ ffi year 2013") such as a fraction 120, ligature 122, or oldstyle FIG. 124. Additionally or alternatively, as shown, the contextual font filtering may be based on one or more font attributes of the text such as ascender 126, x-height 128, baseline 130, or descender 132. In some implementations, the text from which context is determined for filtering is based at least in part on a user selection. For example, the user selection may be received as a result of highlighting a string of selected glyphs in a user interface, placement of a cursor within a selected group of glyphs, placement of a cursor within a selected line of glyphs, "hovering" of a cursor above a selected group of glyphs, and so forth. Other examples are also contemplated, such as gesture (e.g., via a touchscreen or natural user interface), spoken, gaze detection, and so forth.

In another example, the font navigation module 112 is configured to contextually filter available font styles based on a user input selecting one or more font features or font attributes. The user input is received, for instance, in response to presenting font features and/or font attributes identified in a selected text. In this way, the font navigation module 112 identifies font features and font attributes in text within digital content, presents the identified font features and font attributes to the user for selection as font style filters, and then presents candidate font styles based on the font style filters to transform the digital content.

The text editing module 110 is configured to modify text based on user selection of a candidate font style. The text editing module 110, for instance, may store available font styles in a font style library for use in the above described system within the media 106. Additionally or alternatively, text editing module 110 accesses a font style library located on a remote storage device "over the cloud" as via the network 118 as further described in relation to FIG. 6.

Figure 6:
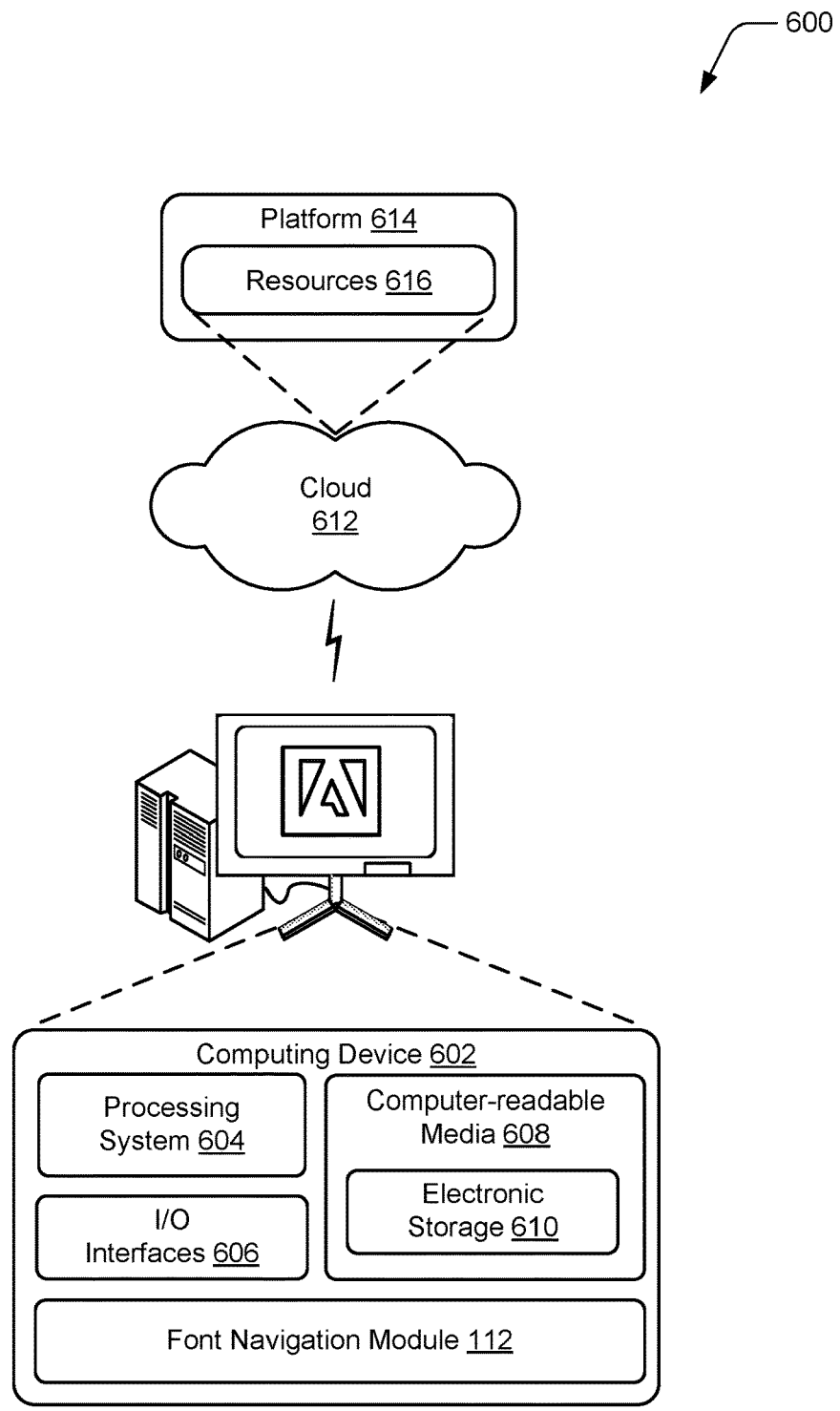
FIG. 6 illustrates an example system including various components of an example device that can be implemented as any type of computing device as described and/or utilize with reference to FIGS. 1-5 to implement implementations of the techniques described herein.

Media 206, the text editing module 110, the font navigation module 112, any combination of elements thereof may be implemented in whole or in part "in the cloud" via network 118, e.g., the Internet, a Wi-Fi network (e.g., in accordance with one or more IEEE 802.11 standards), a wireless network, cellular data network, and so forth, as also further described in relation to FIG. 6.

This constitutes an improvement over conventional approaches which require a user to manually scroll through hundreds or thousands of available font styles to find a font style that conforms to a desired context. The automated nature of locating and presenting candidate font styles automatically and without user intervention based on the desired context provides a fast, efficient, and accurate solution both to the user and the computing device 102 that implements these techniques as discussed below in greater detail.

Figure 2:
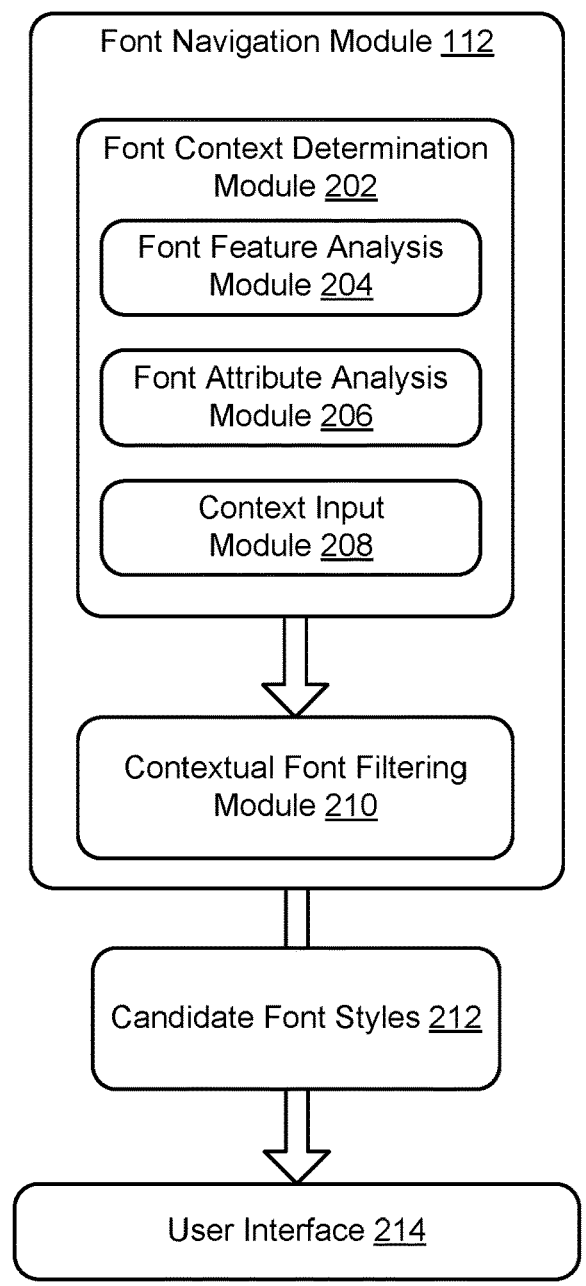
FIG. 2 depicts a system in an example implementation showing the computing device of FIG. 1 in greater detail.
Figure 3:
FIG. 3 depicts example implementations for determining font context.
Figure 3:
Figure 4:
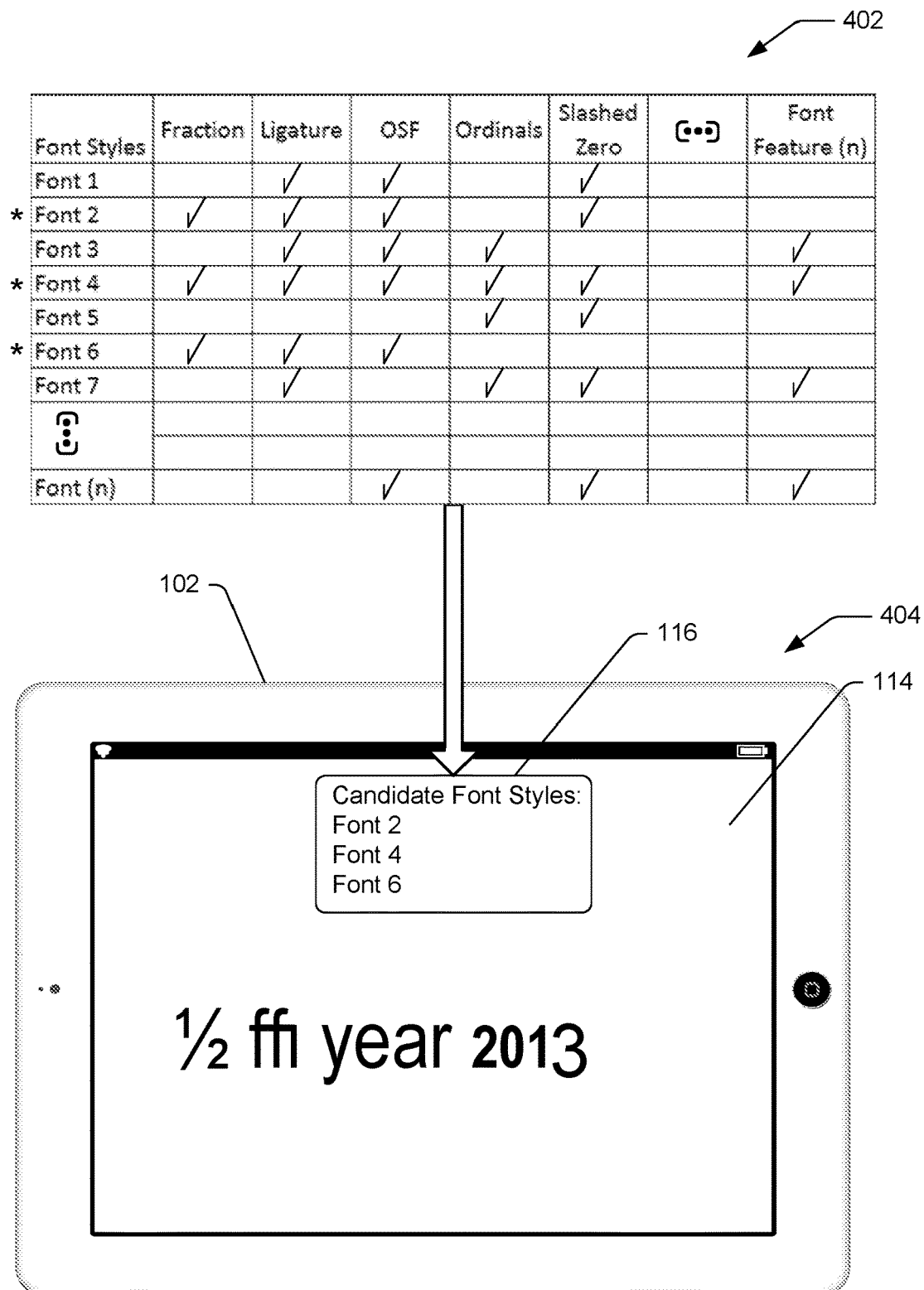
FIG. 4 depicts contextual font filtering of available font styles in a font library and presentation of candidate font styles in a user interface.
Figure 5:
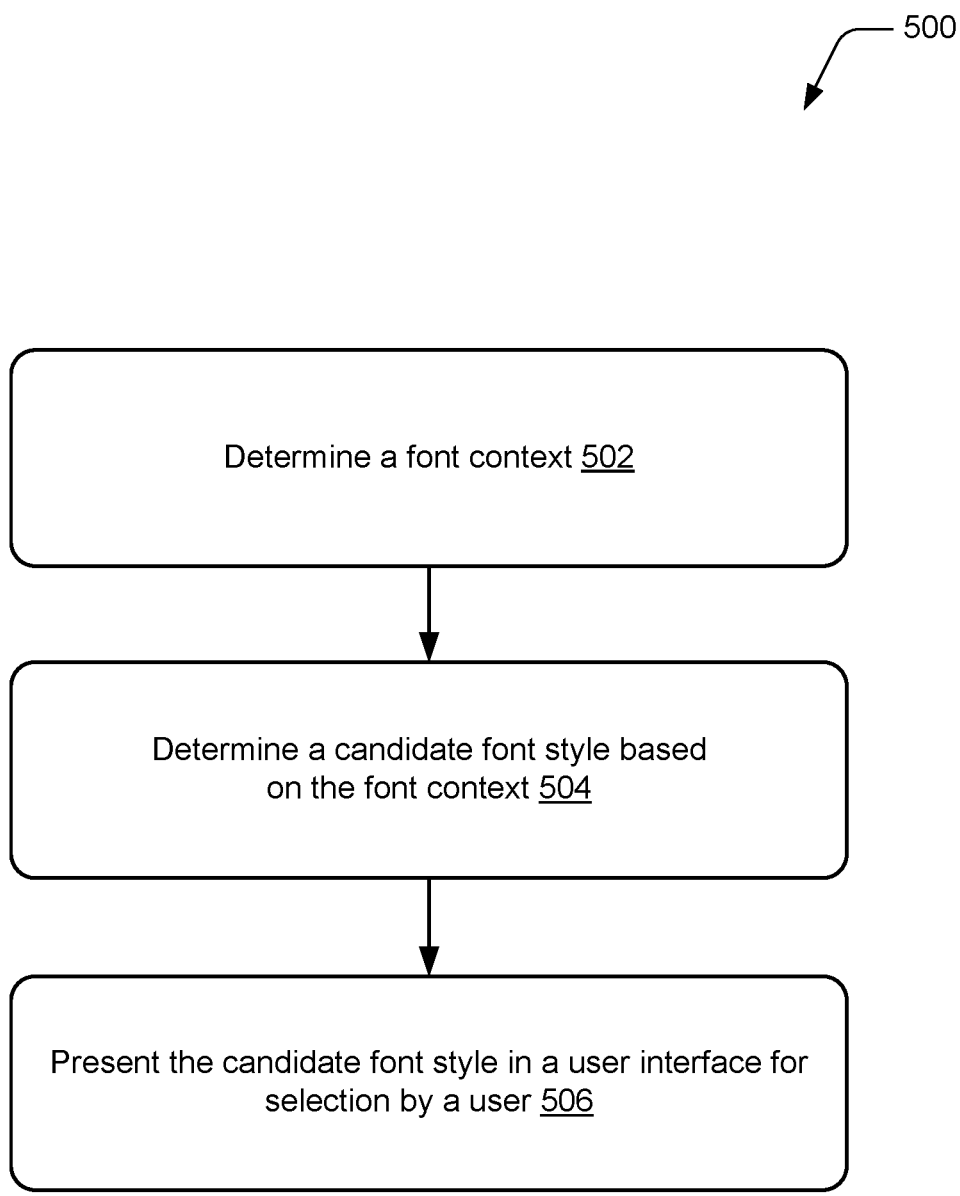
FIG. 5 is a flow diagram depicting a procedure in an example implementation for contextual font filtering

FIG. 2 illustrates an example implementation showing operation of the font navigation module 112 of FIG. 1 in greater detail as system 200. FIG. 3 depicts an example implementation 300 of stages as part of determining a font context. FIG. 4 depicts an example implementation of font filtering based on a determined font context and includes presentation of candidate font styles in a user interface. FIG. 5 depicts a procedure 500 in an example implementation having operations 502-506 in which candidate font styles are presented in a user interface for selection by a user. In the following discussion, reference is made interchangeably to FIGS. 2-5.

In the illustrated system 200 implementation, the font navigation module 112 includes a font context determination module 202 and respective font feature analysis module 204, font attribute analysis module 206, and context input module 208. The font navigation module 112 includes a contextual font filtering module 210 and is configured to present candidate font styles 212 via a user interface 214 for user selection.

To begin, the font context determination module 202 is employed to determine a font context (operation 502) that serves as a basis to identify a contextually relevant font style. The font context determination module 202 may determine font context based on one or more of font features in a selected text via the font feature analysis module 204, font attributes in a selected text via the font attribute analysis module 206, or context input received from a user via the context input module 208.

As illustrated at stage 302, for instance, the font context determination module 202 utilizes the font feature analysis module 204 to identify font features in selected text as a basis to identify a contextually relevant font style. In this example, the font feature analysis module 204 identifies a fraction feature 120, ligature feature 122, and an oldstyle figure feature 124 in the selected text.

To identify the font features, the font feature analysis module 204 utilizes a technique to analyze glyphs in the text by, for example, identifying a Unicode value (such as U+0031 for "1", U+002F for "/" and U+0032 for "2" in the Unicode Standard version 7.0) of characters used in the glyphs from data associated with the text and connecting the Unicode value to a glyph ID (an ID within the font style associating the Unicode value to a font style-defined rendering of the character). Next, the glyph ID is used to identify font features associated with the glyphs (e.g., font features associated with a font style of the glyphs) and determine if the font features are applied to a glyph based on the glyph ID and, in some instances, a context of the glyph. For example, the font feature analysis module 204 may identify a Unicode value of U+0031 and connect the Unicode value, based on a glyph ID, to a rendering of "1" in the font style. If the font style includes a fraction feature, the computer-readable instructions may instruct the user interface to render the "1" as a fraction based on context of other glyphs near the "1" (for example, rendering the "1" as in fraction if the "1" is followed by a "/" and a "2"). Thus, based on the computer-readable instructions of the font style, the font feature analysis module 204 determines which font features are applied to glyphs in the text.

In the illustrated example, the font style used in the selected text at stage 302 includes the features of fractions 120, ligatures 122, and oldstyle FIG. 124. However, if the selected text is limited to "ffi year 2013," the font feature analysis module 204 first identifies Unicode values and connects the Unicode values to glyph IDs for the glyphs in "ffi year 2013." Next, the glyph ID is used to identify font features available to the glyphs based on the computer-readable instructions included in the font style, including at least fractions 120, ligatures 122, and oldstyle FIG. 124. Then, the font feature analysis module 204 determines if the identified font features are applied to the glyphs of the selected text, based on the computer-readable instruction, resulting in a determination that ligatures 122 and oldstyle FIG. 124 are present and that fractions 120 are not present (because ½ is not part of the selected text in this example and the presence of the fraction feature is dependent on a number being followed by "/" and another number in the selected text).

In some instances, a selected portion of text may include a plurality of font styles. In such instances, the font feature analysis module 204 may identify a plurality of font features present in the selection portion of text. Based on this identification, the font feature analysis module 204 may determine which font styles include all or a subset of these font features.

As illustrated at stage 304 the font context determination module 202, additionally or alternatively, utilizes the font attribute analysis module 206 to identify font attributes in selected text as a basis to identify a contextually relevant font style. The font attributes in a selected text are structural elements of a font such as a baseline, an x-height, an ascender height, or a descender height. As depicted in stage 304, for instance, the font attribute analysis module 206 identifies positions of an ascender 126, an x-height 128, a baseline 130, and a descender 132 in the displayed selected text. To identify the font attributes of the selected text, the font attribute analysis module 206 may identify a font style of the selected text and perform a query on the computer-readable instructions included in the font style of the selected text. The query may specify one or more attributes such as a baseline, an x-height, an ascender height, or a descender height. One or more of the attributes may be defined in the computer-readable instructions as a real distance between a baseline, an x-height, an ascender height, or a descender height. Additionally or alternatively, one or more of the baseline, the x-height, the ascender height, or the descender height may be defined as a relative position between heights of another two of the baseline, the x-height, the ascender height, or the descender height. For example, an x-height may be defined as 0.7 of the distance from the baseline to the ascender.

Filtering based on font attributes may be helpful for presenting candidate font styles that are spatially consistent with the selected text. This may be particularly beneficial when the selected text is combined with non-textual objects such as shapes and drawings. Take, for example, a webpage including text and shapes, whose placement is based on the attributes of the text and would necessitate repositioning if the text attributes are modified. If a designer of the webpage desires to modify a font style of the text, the designer is able to filter away font styles that are spatially inconsistent with the font attributes of the selected text, thus allowing the designer to choose among contextually relevant font styles.

Additionally or alternatively, to using the font feature analysis module 204 or the font attribute analysis module 206, the font context determination module may determine context based on inputs received via the context input module 208. As illustrated at stages 306 and 308, the font context determination module 202, utilizes the context input module 208 to receive input to create context as a basis to identify a contextually relevant font style. The input is received, for example, via the user interface 214 of the computing device 102 and may include, for instance, one or more of a click, a scroll, a touch, a hover, a gesture, or a keystroke. The context input module 208 may be used alone to create context, or in may be used in combination with one or both of the font feature analysis module 204 or the font attribute analysis module 206. The context is then delivered to the contextual font filtering module 210 for filtering available font styles.

As depicted in stage 306, for example, the context input module 208 presents a plurality of font features for selection by a user. The plurality of font features may include a list of available font features supported by a computer application in which the text is displayed. Additionally or alternatively, the plurality of font features may include a list of font features included in available font styles stored on a remote computing device (illustrated, for example, as resources 616 of FIG. 6). In the example shown, the context input module 208 then receives at least one input to select fractions, ligature, and oldstyle figures for use as filtering parameters by the contextual font filtering module 210. In this way, a user is able to select one or more font features for filtering available font styles independently from existing text. This may be particularly beneficial before text has been entered or when attempting to match a font style to unrecognized text in an image.

As depicted in stage 308, the context input module 208 may present a user interface for receiving an input selecting, or identifying a value for, font attributes for use as filtering parameters by the contextual font filtering module 210. For example, a user may input an x-height value for use as a filtering parameter by the contextual font filtering module 210 to identify font styles having the specified x-height, or having an x-height within a threshold distance of the specified x-height. The threshold distance may be defined as a distance from the specified x-height, such as 0.1, or may be defined as a percentage of the specified x-height, such as 20%. In this way, a user is able to define one or more font attributes for filtering available font styles independently from existing text. This may be particularly beneficial before text has been entered or when attempting to match a font style to attributes of an image, such as positions of elements within the image.

Additionally or alternatively, the context input module 208 is utilized as a refining of candidate filtering parameters identified by one or both of the font feature analysis module 204 or the font attribute analysis module 206. For example, the context input module 208 may receive input to add, remove, or modify identified font features or defined font attributes that are candidates to be used as filtering parameters by the contextual font filtering module 210.

The contextual font filtering module 210 utilizes font context, as determined by the font context determination module 202, to filter available font styles and determine candidate font styles 212 (operation 504). As depicted in stage 402, a library of font styles may include data, such as metadata, about the font styles derived from the computer-readable instructions included in the font style, to identify font features and font attributes associated with the font styles. As depicted in stages 302 and 306, the context determined by the font context determination module includes fractions, ligature, and oldstyle figures font features. Thus, the contextual font filtering module 210 identifies Font 2, Font 4, and Font 6 as font styles having fractions, ligature, and oldstyle figures font features. Although not shown, the contextual font filtering module 210 may remove one or more of the identified font styles based on the context generated from the font attribute analysis module 206 or the context input module 208.

The library of font styles may be stored locally or may be partially, or entirely, stored remotely, such as "over the cloud," as further described below relative to FIG. 6.

The font navigation module 112 then delivers the candidate font styles 212 to the user interface 214 for presentation to a user (operation 506). As depicted in stage 404, the candidate font styles, for instance, may be presented as a pop-up window for user selection. Additionally or alternatively, the candidate font styles may be stored in a drop down menu to be accessed by the user. Additionally, the user interface 214 may provide a preview of a modification of selected text to a candidate font style in response to receiving input from a user hovering over the candidate font style. In response to an input selecting a candidate font style via the user interface 214, the computing device 102 modifies the selected text based on the computer-readable instructions included in the selected candidate font style. In some implementations, the candidate font styles are presented for purchase by a user from a remote entity.

Thus a user may utilize the font navigation module 112 to filter available font styles and deliver candidate font styles 212 to the user interface 214 for selection by the user. The user may begin by using the font context determination module 202 to determine context for use as filtering parameters in selecting contextually relevant candidate font styles 212. To do this, the user may select text for use by the font feature analysis module 204 and/or the font attribute analysis module 206 to identify font features and/or font attributes present in the selected text as context. Additionally or alternatively, context may be determined in response to the user providing input via the context input module 208 to select or define font features and/or font attributes. Once the context is determined, the contextual font filtering module 210 filters the available font styles and determines candidate font styles 212 as available font styles that include the identified font features and/or font attributes. The user may then access, via the user interface 214, candidate font styles 212 for selection to modify the selected text and/or define subsequently entered text. The user may, for instance, provide input requesting the computing device 102 provide the candidate font styles 212 in a pull down menu by clicking on a title of the currently displayed font style in an application control ribbon. Thus, the user may utilize the system described for contextual font filtering and to simply and quickly access contextually relevant font styles.

Example System and Device

FIG. 6 illustrates an example system generally at 600 that includes an example computing device 602 that is representative of one or more computing systems and/or devices that may implement the various techniques described herein. This is illustrated through inclusion of the font navigation module 112. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 608, and one or more I/O interfaces 606 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 may be implemented, at least in part, in hardware elements that may be configured as processors, functional blocks, and so forth. This may include implementation in hardware as an application specific integrated circuit or other logic device formed using one or more semiconductors. The hardware elements are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 608 is illustrated as including electronic storage 610. Electronic storage represents memory/storage capacity associated with one or more computer-readable media. Electronic storage 610 may include volatile media (such as random access memory (RAM)) and/or nonvolatile media (such as read only memory (ROM), Flash memory, optical disks, magnetic disks, and so forth). Electronic storage 610 may include fixed media (e.g., RAM, ROM, a fixed hard drive, and so on) as well as removable media (e.g., Flash memory, a removable hard drive, an optical disc, and so forth). Computer-readable media 608 may be configured in a variety of other ways as further described below.

Input/output interface(s) 606 are representative of functionality to allow a user to enter commands and information to computing device 602, and also allow information to be presented to the user and/or other components or devices using various input/output devices. Examples of input devices include a keyboard, a cursor control device (e.g., a mouse), touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), a network card, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media 608 may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer-readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer-readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, computer-readable media 608 and other hardware elements are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 612 via a platform 614 as described below.

The cloud 612 includes and/or is representative of the platform 614 for resources 616. The platform 614 abstracts underlying functionality of hardware (e.g., servers) and software resources 616 of the cloud 612. Resources 616 may include applications and/or data that can be utilized while computer processing is executed on servers that are remote from the computing device 602. Resources 616 can also include services provided over the Internet and/or through a subscriber network, such as a cellular or Wi-Fi network.

The platform 614 may abstract resources and functions to connect the computing device 602 with other computing devices. The platform 614 may also serve to abstract scaling of resources to provide a corresponding level of scale to encountered demand for resources 616 that are implemented via the platform 614. Accordingly, in an interconnected device implementation, implementation of functionality described herein may be distributed throughout the system 600. For example, the functionality may be implemented in part on the computing device 602 as well as via the platform 614 that abstracts the functionality of the cloud 612.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital media environment to contextually determine available font styles, a method implemented by at least one computing device, the method comprising:
   receiving, by the at least one computing device, an input selecting text displayed in a user interface;
   identifying, by the at least one computing device, one or more of a plurality of font features included in the selected text, the plurality of font features are typographical features referring to respective design elements of a font used to render the selected text;
   identifying, by the at least one computing device, one or more of a plurality of font attributes included in the selected text, the plurality of font attributes are structural elements of a font used to render the selected text;
   displaying, by the at least one computing device in the user interface, the one or more font features of the plurality of font features and the one or more font attributes of the plurality of font attributes included in the selected text;
   displaying, by the at least one computing device in the user interface, the one or more font features of the plurality of font features and the one or more font attributes of the plurality of font attributes that are not included in the selected text;
   receiving, by the at least one computing device, a user input via the user interface as selecting at least one font feature of the plurality of font features or the one or more font attributes of the plurality of font attributes that are not included in the selected text or deselecting at least one font feature of the plurality of font features or the one or more font attributes of the plurality of font attributes that are included in the text;
   filtering, by the at least one computing device, a plurality of candidate font styles based on at least in part on the received user input; and
   displaying, by the at least one computing device, the filtered plurality of candidate font styles in the user interface that are user selectable to modify the text.

2. A method as recited in claim 1, further comprising receiving an additional input to select one of the filtered plurality of candidate font styles and modifying the text based on the additional input.

3. A method as recited in claim 1, wherein the at least one font feature comprises at least one of fraction, oldstyle figures, ordinals, ligature, or slashed zero.

4. A method as recited in claim 1, wherein the at least one font attribute comprises at least one structural element including x-height, ascender height, descender height, ICF Box size, EM-Box size, or line gap distance.

5. A method as recited in claim 1, wherein:
the filtering further comprises accessing a font style library stored in a font style library of the at least one computing device; and
the at least one computing device causes the filtered plurality of candidate font styles to be presented in a user interface of another computing device.

6. A method as recited in claim 1, wherein:
the text includes a plurality of font styles having font features and font attributes, and
the identifying including identifying at least one font feature or font attribute that is common among the plurality of font styles.

7. A method as recited in claim 1, further comprising receiving another input via the user interface to:
select an additional font feature or font attribute upon which the filtered plurality of candidate font styles are based; or
remove one of the at least one font feature or font attribute.

8. In a digital media environment to contextually determine available font styles, a system comprising:
a processing system; and
a computer-readable storage medium having instructions stored thereon that, responsive to execution by the processing system, causes the processing system to perform operations comprising:
receiving an input selecting text displayed in a user interface;
identifying one or more of a plurality of font features included in the selected text, the plurality of font features are typographical features referring to respective design elements of a font used to render the selected text;
identifying one or more of a plurality of font attributes included in the selected text, the plurality of font attributes are structural elements of a font used to render the selected text;
displaying, in the user interface, a result indicating the one or more font features of the plurality of font features included in the selected text and which font features of the plurality of font features are not;
receiving a user input via the user interface as selecting at least one font feature of the plurality of font features or the one or more font attributes of the plurality of font attributes that are not included in the selected text or deselecting at least one font feature of the plurality of font features or the one or more font attributes of the plurality of font attributes that are included in the text;
filtering a plurality of candidate font styles based on at least in part on the received user input.

9. A system as recited in claim 8, wherein the instructions are further configured to receive an additional input to select one of the filtered plurality of candidate font styles and modify the text based on the additional input.

10. A system as recited in claim 8, wherein the at least one font feature comprises at least one of fraction, oldstyle figures, ordinals, ligature, or slashed zero.

11. A system as recited in claim 8, wherein:
the identifying further comprises identifying, by the at least one computing device, at least one font attribute of the text; and
the filtering further comprises determining at least one candidate font style having the at least one font attribute.

12. A system as recited in claim 11, wherein the at least one font attribute comprises at least one structural element including x-height, ascender height, descender height, ICF Box size, EM-Box size, or line gap distance.

13. A system as recited in claim 8, wherein:
the filtering further comprises accessing a font style library stored in a font style library of the at least one computing device; and
the at least one computing device causes the filtered plurality of candidate font styles to be presented in a user interface of another computing device.

14. A system as recited in claim 8, wherein:
the text includes a plurality of font styles having font features, and
the identifying including identifying at least one font feature that is common among the plurality of font styles.

15. A method as recited in claim 4, wherein the structural element is defined in relation to at least one other structural element or is defined as a real distance from the baseline or ascender.

16. A computer readable storage media having instructions stored thereon that, responsive to execution by a computing device, causes the computing device to perform operations comprising:
receiving an input selecting text displayed in a user interface;
identifying one or more of a plurality of font features included in the selected text, the plurality of font features are typographical features referring to respective design elements of a font used to render the selected text;
identifying one or more of a plurality of font attributes included in the selected text, the plurality of font attributes are structural elements of a font used to render the selected text;
displaying, in the user interface:
the one or more font features of the plurality of font features and the one or more font attributes of the plurality of font attributes included in the selected text; and
the one or more font features of the plurality of font features and the one or more font attributes of the plurality of font attributes that are not included in the selected text;
receiving a user input via the user interface as selecting at least one font feature of the plurality of font features or the one or more font attributes of the plurality of font attributes that are not included in the selected text or deselecting at least one font feature of the plurality of font features or the one or more font attributes of the plurality of font attributes that are included in the text; and
filtering a plurality of candidate font styles based on at least in part on the received user input.

17. A computer readable storage media as recited in claim 16, the operations further comprising receiving an additional input to select one of the filtered plurality of candidate font styles and modifying the text based on the additional input.

18. A computer readable storage media as recited in claim 16, wherein the at least one font feature comprises at least one of fraction, oldstyle figures, ordinals, ligature, or slashed zero.

19. A computer readable storage media as recited in claim 16, wherein the at least one font attribute comprises at least one structural element including x-height, ascender height, descender height, ICF Box size, EM-Box size, or line gap distance.

20. A computer readable storage media as recited in claim 16, wherein:
   the filtering operation further comprises means for accessing a font style library stored in a font style library of the at least one computing device; and
   the displaying operation causes the filtered plurality of candidate font styles to be presented in a user interface of another computing device.

* * * * *